United States Patent [19]

Poelouev

[11] Patent Number: 5,608,630
[45] Date of Patent: Mar. 4, 1997

[54] UNIVERSAL DYNAMIC STABILIZER

[76] Inventor: Avenir P. Poelouev, 33 Chertanovskaya Str., Bldg. 1, Apt. 217, Moscow, Russian Federation, 113519

[21] Appl. No.: 390,766

[22] Filed: Feb. 17, 1995

[51] Int. Cl.$^6$ .................................................. G05B 13/02
[52] U.S. Cl. ............................ 364/424.04; 364/424.05; 364/162; 364/164; 280/707
[58] Field of Search ........................ 364/424.01, 424.05, 364/424.02, 148, 161, 162, 163, 164; 280/707

[56] References Cited

U.S. PATENT DOCUMENTS

| | | | |
|---|---|---|---|
| 3,656,816 | 4/1972 | Schlitz et al. | 303/21 P |
| 4,390,942 | 6/1983 | de Keizer | 364/162 |
| 4,567,564 | 1/1986 | Bittner et al. | 364/434 |
| 4,666,013 | 5/1987 | Shibahata et al. | 180/141 |
| 4,679,809 | 7/1987 | Ito et al. | 280/91 |
| 4,690,431 | 9/1987 | Ito et al. | 280/771 |
| 4,706,771 | 11/1987 | Kawabe et al. | 180/142 |
| 4,828,061 | 5/1989 | Kimbrough et al. | 180/79.1 |
| 4,842,089 | 6/1989 | Kimbrough et al. | 180/79.1 |
| 4,842,342 | 6/1989 | Takahashi et al. | 303/102 |
| 4,872,116 | 10/1989 | Ito et al. | 364/424.05 |
| 4,881,172 | 11/1989 | Miller | 364/424.05 |
| 4,925,345 | 5/1990 | McCown et al. | 405/232 |
| 4,947,327 | 8/1990 | Kawagoe | 364/424.05 |
| 4,962,943 | 10/1990 | Lin | 280/707 |
| 4,995,764 | 2/1991 | Connery et al. | 405/229 |
| 5,150,764 | 9/1992 | Eguchi et al. | 180/141 |
| 5,195,602 | 3/1993 | Weiland | 180/118 |
| 5,198,234 | 3/1993 | Siegenthaler | 425/28.1 |
| 5,216,857 | 6/1993 | Harke | 52/223.6 |
| 5,217,248 | 6/1993 | Reast | 280/718 |
| 5,222,440 | 6/1993 | Schneider | 105/199.1 |
| 5,248,015 | 9/1993 | Yoshioka et al. | 188/299 |
| 5,255,611 | 10/1993 | Schneider | 105/199.2 |
| 5,263,737 | 11/1993 | Furuya et al. | 280/707 |
| 5,288,101 | 2/1994 | Minnett | 280/689 |
| 5,295,705 | 3/1994 | Butsuen et al. | 280/707 |
| 5,322,356 | 6/1994 | Kolbe | 303/111 |
| 5,330,225 | 7/1994 | Hair | 280/703 |
| 5,338,011 | 8/1994 | Hein | 267/140.12 |
| 5,379,210 | 1/1995 | Gruji et al. | 364/148 |

*Primary Examiner*—Kevin J. Teska
*Assistant Examiner*—Thai Phan
*Attorney, Agent, or Firm*—Ray K. Shahani, Esq.

[57] ABSTRACT

A universal dynamic stabilizer for means of transport and structures, the means of transport and structures including automobiles, trucks, railroad vehicles, aircraft, marine vessels, buildings and homes, the universal dynamic stabilizer having position control sensors on the control devices of the means of transport or structure, including control position sensors associated with the direction-change control mechanism, the braking mechanism and the acceleration mechanism of the means of transport and the structure, the position control sensors producing a linear signal proportional to the position of the control mechanisms, the signals produced thereby being used as inputs to a set of first-derivative circuits to produce signals proportional to the first-derivative of the linear signals produced by the position control sensors, the signals produced thereby being used as inputs to a set of second-derivative circuits to produce signals proportional to the second-derivative of the linear signals produced by the position control sensors, all three types of signals being used as inputs to summator circuits, the outputs of the summator circuits being used selectively as inputs to summator convertors directly connected to the suspension mechanisms of the means of transport or structures, whereby the means of transport or structure is provided with additional dynamic stability, especially during operations including turning, braking and accelerating the means of transport and during seismic or meteorological activity affecting the structure.

14 Claims, 1 Drawing Sheet

UNIVERSAL DYNAMIC STABILIZER

FIELD OF THE INVENTION

The present invention relates to the dynamic stabilization of means of transport as well as seismic proofed buildings and other tall structures employing a control device consisting of several control channels, each one of which includes control position and operating parameter sensors, differentiation and summation circuits and related control signals in communication with the associated supporting devices.

BACKGROUND OF THE INVENTION

A wide variety of devices and methods pertaining to suspension mechanisms or methods have been described. Although a comprehensive search has not been performed, the following references are considered relevant to the present invention for stabilizing building, automobiles, and other types of structures and vehicles for transport during seismic or other meteorological events, control or operation. However, none of these documents teach the dynamic stabilization of means of transport or other vehicles or of tall buildings or other structures through the use of their weight proper.

The following documents discuss shock absorbers components of suspension systems. U.S. Pat. No. 5,248,015 issued Sep. 28, 1993 to Yoshioka et al teaches an automobile suspension. A shock absorber controller allows the shock absorber to effectively produce damping forces while at the same time preventing chattering by preventing changes to the damping coefficient. The system essentially comprises a shock absorber of multi-degree variable-damping-coefficient type, a damping force detector, a control means, an inhibition means, and a threshold changing means. U.S. Pat. No. 5,295,705 issued Mar. 22, 1994 to Butsuen et al teaches an automobile suspension including control of variable damping coefficient shock absorber. This invention provides a change control of the damping coefficient carried out so that an actual damping force generated by the shock absorber can harmonize with a target damping force and control the sprung vertical motion off the vehicle. U.S. Pat. No. 5,330,225 issued Jul. 19, 1994 to Hair teaches a passive vehicle suspension system. A plurality of shock absorbers have regions divided into a plurality of chambers by their respective pistons. Sensors are mounted on each wheel to detect movement thereof as well as acceleration roll and pitch sensors being mounted on the vehicle, and fluidic signals are developed by each of the sensors and are applied through a fluidic circuit for application to the valve structures controlling a variable orifice mounted within an interconnecting bypass passageway. Thus, by control of the orifice, the characteristics thereof are changed to in turn change the damping characteristics of each of the shock absorbing units.

The following documents discuss torsion connectors between suspension elements. U.S. Pat. No. 4,962,943 issued Oct. 16, 1990 to Lin teaches a stabilizer bar torsion unit which can be automatically adjusted according to road conditions encountered so as to offer a comfortable ride and a driving safety to the occupants of the automobile. The stabilizer bar unit includes a generally U-shaped stabilizer bar connected to the control arms of two c\aligned wheels of the automobile at two ends thereof. A cylindrical sleeve coaxially surrounds the intermediate portion of the bar in such a manner that w\two sealed annular chambers are formed in the end portions of the sleeve. Movable rings received within the chambers having splined outer surfaces engage the bar and a hydraulic cylinder is connected to the sleeve rotatably. Thus, as the vehicle increases in speed, the rings separate and a greater potential torsion is available by the bar to the wheels of the automobile. U.S. Pat. No. 5,288,101 issued Feb. 22, 1994 to Minnett teaches a variable rate torsion control system for vehicle suspension. The invention uses a torsion bar for conveying torsional forces from one part of the automobile to another. An engagement assembly is provided between the wheel suspension component and the torsion arm for selectively varying the engagement location of the suspension component along the length of the torsion arm as the vehicle moves, thus allowing the amount of leverage applied to the torsion bar to be varied. U.S. Pat. No. 5,338,011, issued Aug. 16, 1994 to Hein teaches a force dampening torque strut for an automobile engine. The torque strut has a unique energy absorbing housing with a pair of energy absorbing cavities formed in the housing for receiving resilient rubber shock absorbing elements.

U.S. Pat. No. 4,925,345 issued May 15, 1990 to McCown Jr. et al discloses a building foundation stabilizing and elevating apparatus. This apparatus consists of a pair of hydraulic cylinders from an upper head assembly from which the cylinders depend downwardly, mounted onto a foundation bracket. This apparatus is designed to prevent buildings from settling or to adjust the position of a building.

U.S. Pat. No. 4,995,764 issued Feb. 12, 1991 to Connery et al teaches a technique for stabilizing building foundations. This system is designed to stabilize a building by it's foundation when the underlying soil is prone to expand and contract in response to changes in water saturation. A ground movement sensor activates a valve which supplies water to the foundation to counteract the downward deflection of the foundation when the soil shrinks sufficiently due to loss of moisture therefrom.

U.S. Pat. No. 5,195,602 issued Mar. 23, 1994 to Weiland teaches a stabilized air cushion vehicle. This invention comprises a plurality of downwardly and inwardly directed air nozzles for producing an air curtain that creates and confines a central primary air cushion beneath the vehicle. When the vehicle leans or dips, the increased pressure of one of the air cushions increases and tends to push the vehicle back up to a level position.

U.S. Pat. No. 5,216,857 issued Jun. 8, 1993 to Harke teaches an apparatus and method for enabling a subsequent stabilization of buildings. This method and apparatus enables subsequent stabilization of buildings with precast floors. Several longitudinally extending cross girders are clamped together and at the building end walls such that the floor zone to be stabilized is encompassed by a rugged ring anchor and, optionally, reinforced by the provision of longitudinally and transversely extending anchors incorporated into the floor in a lattice shaped fashion.

U.S. Pat. No. 5,217,248 issued Jun. 8, 1993 to Reast teaches a vehicle suspension system. A plurality of leaf springs arranged generally transversely of the longitudinal axis of the associated vehicle act in conjunction with additional suspending devices, such as leaf springs, coil springs, hydraulic, pneumatic or other system, provide the vehicle with an anti-roll characteristic when operating under certain conditions.

U.S. Pat. No. 5,222,440 issued Jun. 24, 1993 to Schneider teaches a tilt compensator for high-speed vehicles, in particular rail vehicles. This device is designed to compensate the tilt of the carriage body of a rail vehicle when traveling around sharp turns at high speeds. A pair of transverse air springs provide an energy source and, in conjunction with a tilt compensator, prevent the carriage of the rail vehicle from tilting uncontrollably during turns at high speeds upon a superelevated track.

U.S. Pat. No. 5,263,737 issued Nov. 23, 1993 to Furuya et al teaches a device for stabilizing the attitude of an automobile. The device includes a cylinder means independently disposed between the road wheels and the automobile body, the cylinder having respective fluid chambers in fluid communication with each other, a valve means for pressurizing the chambers, and a detection means for detecting the speed and the steering reactive forces of the vehicle such that the valve means transfers fluid from the chambers of the radially inner side of a turning vehicle to the chambers of the radially outer side of the turning vehicle, thereby stabilizing the attitude f the automobile.

U.S. Pat. No. 5,322,356 issued Jun. 21, 1994 to Kolbe et al teaches a method and circuit configuration to augment the driving stability of a road vehicle. This invention utilizes traction slip control by brake management. The drive wheel which exhibits the higher coefficient of friction is identified and the rotational pattern of this wheel is monitored and stabilized by brake management as soon as the traction slip of this wheel exceed a limit value. Braking pressure which may exist in the wheel brake of the second drive wheel is decreased.

As will be apparent from the foregoing prior art, there are numerous descriptions of suspension and stabilizing devices intended for use with cars, trucks and trains as well as for buildings and other structures. However, none of these inventions are able to be controlled according to information obtained by measuring the actual operational parameters of the vehicle or structure. The purposeful control of the functioning of existing devices has not heretofore been achieved but is now possible.

OBJECTS AND SUMMARY OF THE INVENTION

The purpose of this invention is to guarantee a stable, non-overturning means of transport under standard operating conditions as well as to provide a dynamic stabilization of seismic proofed buildings and other tall or large structures during earthquakes as well as other significant meteorological events. The primary elements of this invention are the same for the case of structures and for the case of transport vehicles, as will become obvious. With reference to automobiles, trucks and the like, it is a common occurrence for a motorist to cause the vehicle he or she is operating to accelerate, decelerate or turn rapidly. The forces operating on the vehicle may cause the vehicle to skid, fishtail, or oven overturn in the case of excessive turning under excessive speed. This loss of control is a problem in that it can cause extreme personal injuries as well as property damages.

As it is also well known, when a motor vehicle moves along a curvature of a road, two overturning moments act upon the motorcar simultaneously: one of them is generated by a centrifugal force being engendered during the movement along the curvature of the road depending upon the radius of the turn, the mass, speed and center of gravity of the vehicle, etc. and the second force is generated by a reaction of the suspension of the vehicle, e.g. springs on the inner side of the vehicle in relation to the turn. This reaction of the suspension system may be of a considerable value, oftentimes equal to as much or more than half of the total weight of the vehicle. Under the action of these overturning moments, the vehicle, often inclined toward the outside of the curvature of the turn, is in a most unfavorable position.

Therefore, the purpose of this invention is to stabilize vehicles during operation, especially during accelerations, deceleration or turning. It will be understood, therefore, that the term "means of transport" refers to any and all types of moving vehicles such as automobiles, trucks of all types, railroad engines, cars and trains, etc. Possible "means of transport" will also include aircraft, helicopters, boats, ship and other nautical devices. Similarly, the same principles can be applied to the stabilization of structures such as buildings, etc. During high winds or seismic events, stabilization of large building can become very important for safety, building integrity and other obvious reasons.

This invention teaches a universal dynamic stabilizer for stabilizing almost any means of transport, the means of transport having a direction control mechanism, a braking mechanism and an acceleration mechanism. The universal dynamic stabilizer comprises a first channel connected to the direction control mechanism, a second channel connected to the braking mechanism and a third channel connected to the acceleration mechanism. A first control position sensor is used for sensing the position of the direction control mechanism and producing a linear signal proportional to the position of the direction control mechanism. A second control position sensor is used for sensing the position of the braking mechanism and producing a linear signal proportional to the position of the braking mechanism. A third control position sensor is used for sensing the position of the acceleration mechanism and producing a linear signal proportional to the position of the acceleration mechanism. A first first-derivative circuit has as an input the signal produced by the first control position sensor and produces a signal proportional to the first derivative of the signal produced by the first control position sensor. A second first-derivative circuit has as an input the signal produced by the second control position sensor and produces a signal proportional to the first derivative of the signal produced by the second control position sensor. A third first-derivative circuit has as an input the signal produced by the first control position sensor and produces a signal proportional to the first derivative of the signal produced by the third control position sensor. A first second-derivative circuit has as an input the signal produced by the first first-derivative circuit and produces a signal proportional to the second derivative of the signal produced by the first control position sensor. A second second-derivative circuit has as an input the signal produced by the second first-derivative circuit and produces a signal proportional to the second derivative of the signal produced by the second control position sensor. A third second-derivative circuit has as an input the signal produced by the third first-derivative circuit and produces a signal proportional to the second derivative of the signal produced by the third control position sensor. A first summator has as inputs the signals produced by the first control position sensor, the first first-derivative circuit and the first second-derivative circuit and has an output. A second summator has as inputs the signals produced by the second control position sensor, the second first-derivative circuit and the second second-derivative circuit and has an output. A third summator has as inputs the signals produced by the third control position sensor, the third first-derivative circuit and the third second-derivative circuit and has an output. A direction switch has as an input the output of the first summator and has a first output and a second output. A first summator converter has as inputs the first output of the direction switch and the output of the third summator and produces a first control signal. A second summator converter has as inputs the first output of the direction switch and the output of the second summator and produces a second control signal. A third summator converter has as inputs the second output of the direction switch and the output of the third summator and produces a third control signal. A fourth summator converter has as inputs the second output of the direction switch and the output of the second summator and produces a fourth control signal. A first suspension mechanism is controlled by the first control signal, the first suspension mechanism suspending primarily the left from end of the means of transport. A second suspension mechanism is controlled by the second control signal, the second suspension mechanism suspending primarily the left rear end of the means of transport. A third suspension mechanism is controlled by the third control signal, the third suspension mechanism suspending primarily the right front end of the means of transport. A fourth suspension mechanism is controlled by the fourth control signal, the fourth suspension mechanism suspending primarily the right rear end of the means of transport, whereby the means of transport is provided with additional dynamic stability especially during operations including turning, braking and accelerating the means of transport. The means of transport may be an automobile, a truck, a railroad vehicle, an aircraft or a marine vessel.

This invention also teaches a universal dynamic stabilizer for stabilizing a means of transport, the means of transport having a direction control mechanism, a braking mechanism and an acceleration mechanism. The universal dynamic stabilizer comprises a plurality of control position sensors, the control position sensors each being associated with an individual control mechanism for the means of transport including at least one direction change mechanism position sensor, at least one braking mechanism position sensor and at least one acceleration mechanism position sensor. The control position sensors each produce a linear signal proportional to the respective associated control mechanism. A plurality of first-derivative circuits each have an associated control position sensor, each first-derivative circuit having as an input the signal produced by the associated control position sensor and each first-derivative circuit producing a signal proportional to the first derivative of the input signal produced by the associated control position sensor. A plurality of second-derivative circuits each have an associated first-derivative circuit and an associated position control circuit, each second-derivative circuit having as an input the signal produced by the associated first-derivative circuit and each second derivative circuit producing a signal proportional to the second derivative of the input signal produced by the associated control position sensor. A plurality of summators each have an associated second-derivative circuit and an associated first-derivative circuit and an associated control position sensor, each summator having as inputs the signal produced by the associated control position sensors, the signal produced by the associated first-derivative circuit and the signal produced by the associated second-derivative circuit, and each summator having an output. A plurality of summator convertors each having associated summator have as inputs the signals produced by the associated summators, each summator convertor producing a control signal. A plurality of suspension mechanisms are employed, one or more suspension mechanisms mounted on the means of transport at individual points of suspension of the means of transport. Each suspension mechanism has an associated summator convertor and each suspension mechanism is controlled by the control signal produced by the associated summator convertor.

This invention also teaches a universal dynamic stabilizer for stabilizing a structure. The universal dynamic stabilizer comprises a plurality of control position sensors, the control position sensors each being associated with an individual control mechanism for the structure. The control position sensors each produce a linear signal proportional to the respective associated control mechanism. A plurality of first-derivative circuits each have an associated control position sensor, each first-derivative circuit having as an input the signal produced by the associated control position sensor and each first-derivative circuit producing a signal proportional to the first derivative of the input signal produced by the associated control position sensor. A plurality of second-derivative circuits each have an associated first-derivative circuit and an associated position control circuit, each second-derivative circuit having as an input the signal produced by the associated first-derivative circuit and each second derivative circuit producing a signal proportional to the second derivative of the input signal produced by the associated control position sensor. A plurality of summators each have an associated second-derivative circuit and an associated first-derivative circuit and an associated control position sensor, each summator having as inputs the signal produced by the associated control position sensors, the signal produced by the associated first-derivative circuit and the signal produced by the associated second-derivative circuit, and each summator having an output. A plurality of summator convertors each having associated summators have as inputs the signals produced by the associated summators, each summator convertor producing a control signal. A plurality of suspension mechanisms are employed, one or more suspension mechanisms mounted on the structure at individual points of suspension of the means of transport. Each suspension mechanism has an associated summator convertor and each suspension mechanism is controlled by the control signal produced by the associated summator convertor.

Numerous other advantages and features of the present invention will become readily apparent from the following detailed description of the invention and the embodiments thereof, from the claims and from the accompanying drawings in which the details of the invention are fully and completely disclosed as a part of this specification.

DETAILED DESCRIPTION OF THE INVENTION

Figure 1:
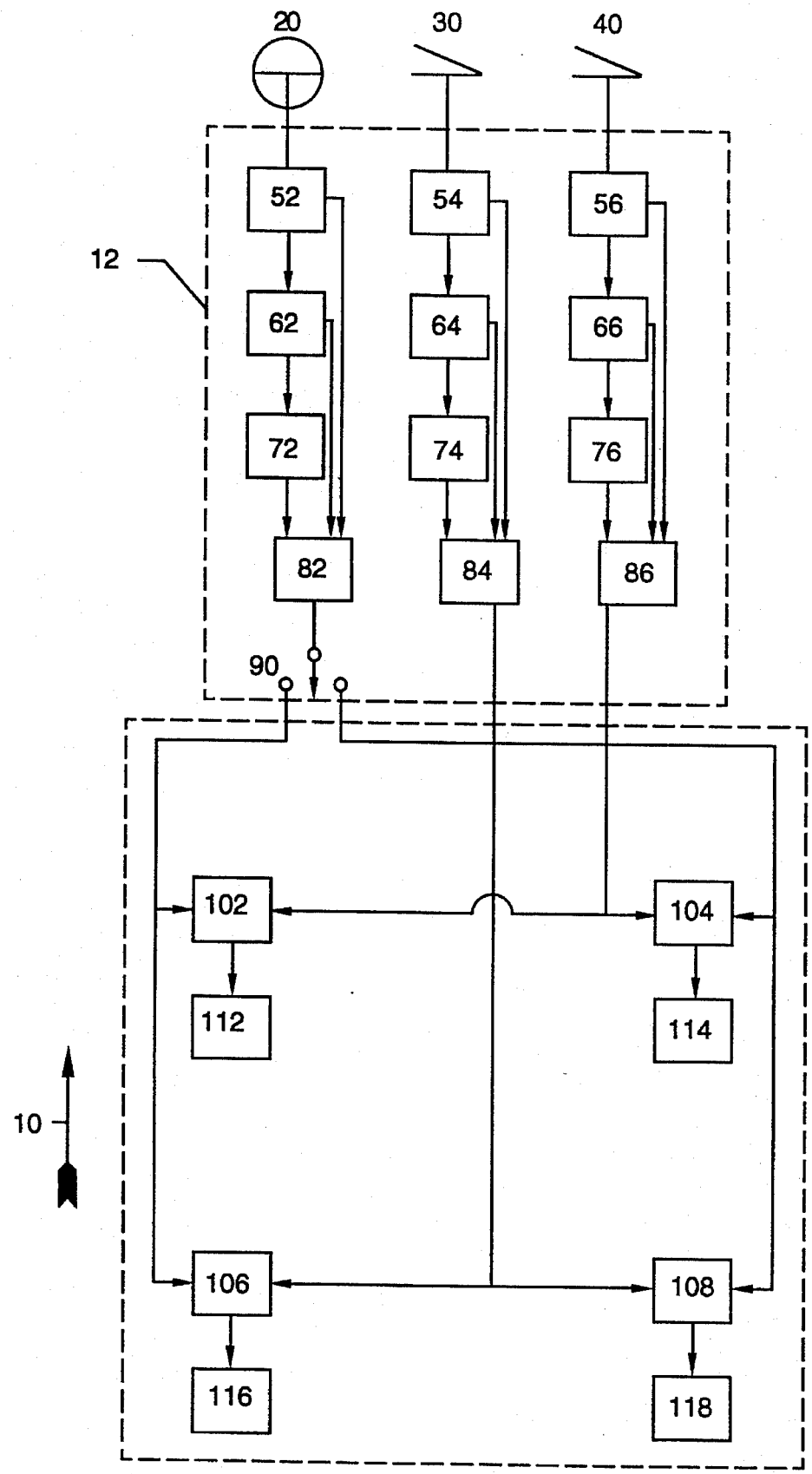
FIG. 1 is a block diagram of a preferred embodiment of the present invention referring specifically to the present invention in conjunction with a four wheeled vehicle.

The universal dynamic stabilizer of the present invention includes a control devices consisting of three control channels, each one of which includes a control position sensor connected with a first differentiation circuit. This circuit is connected with a second differentiation circuit. The output ports of the positions sensors as well as the differentiation circuits are connected to summators. At the output port of the direction-change or steering wheel channel there is a direction switch with two output ports. Operating devices are mounted in all points of suspension and are controlled by summation convertors. The output ports of the direction-change channel summator are connected with first input ports of the summation convertors located at each wheel on either side of the means of transport. The output port of the brake pedal channel is connected with the second input ports of the summation convertors of the rear points of suspension, while the output ports of the accelerator pedal channel are connected with the second input ports of the summation converters of the front points of suspension.

FIG. 1 is a block diagram of a preferred embodiment of the present invention. It will be obvious that the direction of motion of the means of transport is indicated by arrow 10. The control device 12 is shown with three control channels. These correspond with the steering wheel channel 20, the brake pedal channel 30, and the accelerator pedal channel 40. Each channel has an associated linear control position sensor unit, 52, 54 and 56, respectively. Each associated linear control position sensor unit is used to measure and communicate the precise position of each of the steering wheel, the brake pedal and the accelerator pedal of the vehicle. These signals can be normalized to unity or to some other "generic" value. These position sensors communicate directly with differentiation circuits of the first derivative, 62, 64 and 66. These differentiation circuits of the first derivative process the information input from the linear control position sensors and produce signals which correspond and correlate to the change in value sensed by the linear control position sensors. Differentiation circuits of the second derivative 72, 74 and 76 further process the signals produced by the differentiation circuits of the first degree, and generate signals corresponding to and correlating with the differential in the signals produced by the differentiation circuits of the first derivative.

Signals from the position sensors as well as the differentiation circuits for each channel are communicated to summators 82, 84 and 86. The output of summator 82 is then passed through switch 90 corresponding to the steering wheel position, which diverts the signal from the summator to either summation convertors 102 and 106, corresponding with the left side of the vehicle, or to summation convertors 104 and 108, corresponding with the right side of the vehicle. The output from the brake channel summator 84 is directed to the rear wheel summation convertors 106 and 108. Similarly, the output from the acceleration channel summator 86 is directed to the rear wheel summation convertors 102 and 104. In this manner, signals corresponding to the steering wheel position are directed to the left and the right sides of the vehicle while signals corresponding to the brake pedal position are directed to the rear of the vehicle and signals corresponding to the accelerator pedal position are directed to the front of the vehicle. These summation convertors then send direct control signals to the points of suspension working mechanisms 112, 114, 116 and 118. The working mechanisms are mounted at all of the suspension points and are kinematically connected with the suspended body and the chassis of the vehicle. These working mechanisms can be utilized in conjunction with the suspension system of the vehicle.

The universal dynamic stabilizer system of the present invention functions in the following manner: When the position of the steering wheel, brake pedal or the accelerator pedal position is changed, the respective position sensors measure the change and send a corresponding, linear signal proportional to the amount of travel of the controls. This signal is subsequently fed to the differentiation circuits and then to the summators. The output signals are proportional to the vehicles speed and acceleration and direction of travel. These outputs from the summators are fed directly to the summation converters which act on the working mechanisms of the stabilization system itself.

The value of the force generated by the invention in any point of suspension is defined according to the following equation:

$$P_i = Al_i + \frac{Bdl_i}{dt} + \frac{Cd^2l_i}{dt^2} - f,$$

where: P—the force generated by the invention at the i-th point of suspension;

l—the value of the travel of the corresponding controls;

A, B and C—the proportionality coefficients depending on design parameters of the system being dynamically stabilized and its controls; and f—a feedback force defined by the design features of the system being dynamically stabilized and its controls.

When turning the steering wheel to the left, for example, the corresponding operating mechanisms of the stabilization system in the left side of the means of transport begin to function. As the degree of rotation of the steering wheel is increased, the greater the magnitude of the electric current or other signal being generated becomes, and the greater becomes the magnitude of the control signal acting upon the suspension mechanism of the means of transport. As a result, the suspension system on the left side of the means of transport is compensated such that the vehicle would otherwise tend to become inclined to the left while being in a more favorable position for making the left turn. At the same time, the center of gravity of the means of transport would be lowered, effectively the overturning moment of the centrifugal forces acting upon the means of transport and ensuring an additional dynamic stabilization of the means of transport. The invention functions in a similar way during the right turn.

When applying the brakes, the suspension points of the rear of the means of transport become functional under the action of the brake control channel. The effect is to eliminate the upward "jerk" motion in the rear of the vehicle. The actual suspension force provided by the suspension mechanism is reduced thereby allowing the weight proper of the means of transport to exert an increased downward force. The acceleration channel functions in an analogous way to avert the otherwise normal lifting effect on the front end of the vehicle during acceleration. As acceleration occurs, the control signals to the front suspension mechanisms reduce the amount of support provided by the front suspension system to counteract the gyroscopic forces acting to raise the front end of the means of transport during acceleration.

The universal dynamic stabilizer of the present invention can also be utilized for dynamic stabilization of tall buildings and structural seismoproofing. In these applications, the invention is particularly useful when buildings are subject to particular forces, the most dangerous of those forces being horizontal forces created by high ambient winds and horizontal and vertical forces caused by earthquakes. In these cases, the structure can be thought of as a special means of surface transport wherein the foundation functions as a sort of chassis of special design in effect suspending the remainder of the structure. In such cases, the invention may contain several control channels depending on the number of the points of suspension of the structure, that number of points and their locations having been calculated in advance, to provide the necessary corresponding dynamic alterations in the bearing reaction support configurations.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

I claim:

1. A universal dynamic stabilizer for stabilizing means of transport through control of it's weight proper, the means of transport having a direction control mechanism, a braking mechanism and an acceleration mechanism, the universal dynamic stabilizer comprising:

a first channel connected to the direction control mechanism;

a second channel connected to the braking control mechanism;

a third channel connected to the acceleration control mechanism;

a first control position sensor for sensing the position of the direction control mechanism and producing a linear signal proportional to the position of the direction control mechanism;

a second control position sensor for sensing the position of the braking control mechanism and producing a linear signal proportional to the position of the braking control mechanism;

a third control position sensor for sensing the position of the acceleration control mechanism and producing a linear signal proportional to the position of the acceleration control mechanism;

a first first-derivative circuit having as an input the signal produced by the first control position sensor and producing a signal proportional to the first derivative of the signal produced by the first control position sensor;

a second first-derivative circuit having as an input the signal produced by the second control position sensor and producing a signal proportional to the first derivative of the signal produced by the second control position sensor;

a third first-derivative circuit having as an input the signal produced by the first control position sensor and producing a signal proportional to the first derivative of the signal produced by the third control position sensor;

a first second-derivative circuit having as an input the signal produced by the first first-derivative circuit and producing a signal proportional to the second derivative of the signal produced by the first control position sensor;

a second second-derivative circuit having as an input the signal produced by the second first-derivative circuit and producing a signal proportional to the second derivative of the signal produced by the second control position sensor;

a third second-derivative circuit having as an input the signal produced by the third first-derivative circuit and producing a signal proportional to the second derivative of the signal produced by the third control position sensor;

a first summator having as inputs the signals produced by the first control position sensor, the first first-derivative circuit and the first second-derivative circuit and having an output;

a second summator having as inputs the signals produced by the second control position sensor, the second first-derivative circuit and the second second-derivative circuit and having an output;

a third summator having as inputs the signals produced by the third control position sensor, the third first-derivative circuit and the third second-derivative circuit and having an output;

a direction switch having as an input the output of the first summator and having a first output and a second output;

a first summator converter having as inputs the first output of the direction switch and the output of the third summator and producing a first control signal;

a second summator converter having as inputs the first output of the direction switch and the output of the second summator and producing a second control signal;

a third summator converter having as inputs the second output of the direction switch and the output of the third summator and producing a third control signal;

a fourth summator converter having as inputs the second output of the direction switch and the output of the second summator and producing a fourth control signal;

a first suspension mechanism controlled by the first control signal, the first suspension mechanism suspending primarily the left front end of the means of transport, the first control signal for controlling the first suspension mechanism;

a second suspension mechanism controlled by the second control signal, the second suspension mechanism suspending primarily the left rear end of the means of transport, the second control signal for controlling the second suspension mechanism;

a third suspension mechanism controlled by the third control signal, the third suspension mechanism suspending primarily the right front end of the means of transport, the third control signal for controlling the third suspension mechanism; and a fourth suspension mechanism controlled by the fourth control signal, the fourth suspension mechanism suspending primarily the right rear end of the means of transport, the fourth control signal for controlling the fourth suspension mechanism, whereby the means of transport is provided with additional dynamic stability especially during operations including turning, braking and accelerating the means of transport by increasing or decreasing normal forces corresponding to the weight proper of the means of transport acting on the first, second, third and fourth suspension mechanisms by shifting the center of gravity of the means of transport appropriately and according to the first, second, third and fourth control signals produced by the first, second, third and fourth summator converters.

2. The invention of claim 1 wherein the means of transport is an automobile.

3. The invention of claim 1 wherein the means of transport is a truck.

4. The invention of claim 1 wherein the means of transport is a railroad vehicle.

5. The invention of claim 1 wherein the means of transport is an aircraft.

6. The invention of claim 1 wherein the means of transport is a marine vessel.

7. The invention of claim 1 wherein the means of transport is a spacecraft.

8. A universal dynamic stabilizer for stabilizing means of transport, the means of transport having a direction control mechanism, a braking mechanism and an acceleration mechanism, the universal dynamic stabilizer comprising:

a plurality of control position sensors, the control position sensors each being associated with an individual control mechanism for the means of transport including at least one direction change mechanism position sensor, at least one braking mechanism position sensor and at least one acceleration mechanism position sensor, the control position sensors each producing a linear signal proportional to the respective associated control mechanism;

a plurality of first-derivative circuits, each control position sensor having an associated control position sensor, each first-derivative circuit having as an input the signal produced by the associated control position sensor and each first-derivative circuit producing a signal proportional to the first derivative of the input signal produced by the associated control position sensor;

a plurality of second-derivative circuits, each having an associated first-derivative circuit and an associated position control circuit, each second-derivative circuit having as an input the signal produced by the associated first-derivative circuit and each second derivative circuit producing a signal proportional to the second derivative of the input signal produced by the associated control position sensor;

a plurality of summators, each summator having an associated second-derivative circuit and an associated first-derivative circuit and an associated control position sensor, each summator having as inputs the signal produced by the associated control position sensors, the signal produced by the associated first-derivative circuit and the signal produced by the associated second-derivative circuit, each summator having an output;

a plurality of summator convertors, each summator convertor having associated summators, each summator convertor having as inputs the signals produced by the associated summators, each summator convertor producing a control signal;

a plurality of suspension mechanisms, one or more suspension mechanisms mounted on the means of transport at individual points of suspension of the means of transport, each suspension mechanism having an associated summator convertor, each suspension mechanism being controlled by the control signal produced by the associated summator convertor such that during operation of the means of transport such as turning, braking and accelerating, normal forces corresponding to the weight proper of the means of transport acting on each of the plurality of suspension mechanisms individually are increased and decreased by shifting the center of gravity of the means of transport appropriately and according to the plurality of control signals produced by the plurality of summator converters.

9. The invention of claim 8 wherein the means of transport is an automobile.

10. The invention of claim 8 wherein the means of transport is a truck.

11. The invention of claim 8 wherein the means of transport is a railroad vehicle.

12. The invention of claim 8 wherein the means of transport is an aircraft.

13. The invention of claim 8 wherein the means of transport is a marine vessel.

14. The invention of claim 8 wherein the means of transport is a spacecraft.

* * * * *